US009347006B2

(12) United States Patent
Koseoglu et al.

(10) Patent No.: US 9,347,006 B2
(45) Date of Patent: May 24, 2016

(54) METHOD FOR OPTIMIZING CATALYST LOADING FOR HYDROCRACKING PROCESS

(71) Applicants: SAUDI ARABIAN OIL COMPANY, Dhahran (SA); JGC CATALYSTS AND CHEMICALS LTD., Kawasaki Kanagawa (JP); JAPAN COOPERATION CENTER, PETROLEUM, Tokyo (JP)

(72) Inventors: Omer Refa Koseoglu, Dhahran (SA); Adnan Al-Hajji, Dhahran (SA); Hendrik Muller, Dhahran (SA); Masaru Ushio, Kawasaki (JP); Koji Nakano, Fukuoka (JP)

(73) Assignees: Saudi Arabian Oil Company, Dhahran (SA); JGC Catalysts and Chemicals Ltd., Kawasaki (JP); Japan Cooperation Center, Petroleum, Tokyo (JP)

( * ) Notice: Subject to any disclaimer, the term of this patent is extended or adjusted under 35 U.S.C. 154(b) by 167 days.

(21) Appl. No.: 14/149,274

(22) Filed: Jan. 7, 2014

(65) Prior Publication Data

US 2014/0190868 A1 Jul. 10, 2014

Related U.S. Application Data

(60) Provisional application No. 61/750,152, filed on Jan. 8, 2013.

(51) Int. Cl.
| | |
|---|---|
| *C10G 47/12* | (2006.01) |
| *C10G 47/14* | (2006.01) |
| *C10G 47/16* | (2006.01) |
| *C10G 47/18* | (2006.01) |
| *C10G 47/20* | (2006.01) |
| *C10G 65/02* | (2006.01) |
| *C10G 65/12* | (2006.01) |
| *C10G 45/04* | (2006.01) |
| *C10G 45/06* | (2006.01) |
| *C10G 45/10* | (2006.01) |
| *C10G 45/12* | (2006.01) |
| *C10G 45/32* | (2006.01) |
| *C10G 45/44* | (2006.01) |
| *C10G 47/02* | (2006.01) |
| *C10G 49/00* | (2006.01) |
| *C10G 49/02* | (2006.01) |
| *C10G 49/04* | (2006.01) |
| *C10G 49/06* | (2006.01) |
| *C10G 49/08* | (2006.01) |
| *B01J 35/00* | (2006.01) |
| *B01J 23/882* | (2006.01) |
| *B01J 23/883* | (2006.01) |
| *B01J 29/08* | (2006.01) |
| *B01J 29/16* | (2006.01) |

(52) U.S. Cl.
CPC ............... *C10G 65/12* (2013.01); *B01J 23/882* (2013.01); *B01J 23/883* (2013.01); *B01J 29/084* (2013.01); *B01J 29/166* (2013.01); *B01J 35/0006* (2013.01); *C10G 45/04* (2013.01); *C10G 45/06* (2013.01); *C10G 45/10* (2013.01); *C10G 45/12* (2013.01); *C10G 45/32* (2013.01); *C10G 45/44* (2013.01); *C10G 47/02* (2013.01); *C10G 49/002* (2013.01); *C10G 49/02* (2013.01); *C10G 49/04* (2013.01); *C10G 49/06* (2013.01); *C10G 49/08* (2013.01); *C10G 2300/202* (2013.01)

(58) Field of Classification Search
CPC ........ C10G 47/12; C10G 47/14; C10G 47/16; C10G 47/18; C10G 47/20; C10G 65/02
See application file for complete search history.

(56) References Cited

U.S. PATENT DOCUMENTS

| | | | | |
|---|---|---|---|---|
| 3,536,805 | A | | 10/1970 | Kittrell |
| 5,071,805 | A | * | 12/1991 | Winslow et al. ................ 502/66 |
| 6,712,955 | B1 | * | 3/2004 | Hou et al. ................ 208/216 R |

FOREIGN PATENT DOCUMENTS

WO            9321284  A1     10/1993

OTHER PUBLICATIONS

M. A. Rodriguez and J. Ancheyta, Modeling of Hydrodesulfurization (HDS), Hydrodenitrogenation (HDN), and the Hydrogenation of Aromatics (HDA) in a Vacuum Gas Oil Hydrotreater, 18 ENERGY FUELS 789-794 (2004).*
International Search Report for PCT/US2014/010481 dated Nov. 10, 2014 (4 pages).

* cited by examiner

*Primary Examiner* — Randy Boyer
(74) *Attorney, Agent, or Firm* — Abelman, Frayne & Schwab

(57) ABSTRACT

The invention relates to a method for optimizing layered catalytic processes. This is accomplished by testing various catalysts with a compound found in a feedstock to be tested, to determine the facility of the catalyst in hydrogenating, hydrosulfurizing, or hydrodenitrogenating the molecule, and hence the feedstock. In a preferred embodiment, the Double Bond Equivalence of the feedstock and molecule are determined, and catalysts are pre-selected based upon their known ability to work with materials of this DBE value.

15 Claims, No Drawings

METHOD FOR OPTIMIZING CATALYST LOADING FOR HYDROCRACKING PROCESS

RELATED APPLICATION

This application claims priority from U.S. Provisional Application No. 61/750,152 filed Jan. 8, 2013, incorporated by reference in its entirety.

FIELD OF THE INVENTION

The invention relates to methods for improving, and/or optimizing catalytic, hydrocracking processes, via layering a plurality of different catalysts in an order determined by the material to be hydrocracked (e.g., feedstock) and the properties of the catalysts that are used.

BACKGROUND AND PRIOR ART

Hydrocracking is an established, reliable and flexible method for transforming materials such as low-value heavy oil fractions into higher value products. Configuration, catalyst choices and operating conditions of the hydrocracking processes and apparatus used, offer flexibility in, e.g., the selection of feedstock, the products of the hydrocracking, operating efficiency, and profitability. Several process configurations are available, including but not being limited to, once-through (or series flow), two-stage, single stage, mild hydrocracking etc., with catalysts. The choice of catalysts and their layering are also important in adapting the general processes to produce the desired products.

Hydrocracking processes are used widely in, e.g., petroleum refineries. They are used to process a variety of feedstocks, which usually boil in the range of 370° C. to 520° C. in conventional hydrocracking units, and boil at 520° C. and above in residue hydrocracking units. In general, hydrocracking processes split the molecules of the feed into smaller, i.e., lighter molecules, having higher average volatility and economic value.

Additionally, hydrocracking processes typically improve the quality of the hydrocarbon feedstock used by increasing the hydrogen to carbon ratio of the products of hydrocracking, and by removing organosulfur and/or organonitrogen compounds. The significant economic benefit derived from hydrocracking processes has resulted in substantial improvements of the process, and in more active catalysts.

Mild hydrocracking, or single stage once-through hydrocracking, occurs at operating conditions that are more severe than standard hydrotreating processes, and which are less severe than conventional, full conversion or high pressure hydrocracking processes. Mild hydrocracking processes are more cost effective, but typically result in lower product yields and quality. They produce less middle distillate products of relatively lower quality, as compared to the products of conventional full conversion or high pressure hydrocracking processes.

Single or multiple catalytic systems can be used in these processes, depending upon the feedstock being processed and the product specifications. Single stage hydrocracking is the simplest of the various configurations, and is typically designed to maximize middle distillate yield over a single or multiple catalyst system. Multiple catalyst systems can be deployed, e.g., as a stacked-bed configuration or in multiple reactors.

In a series-flow configuration, the entire hydrocracked product stream from the first reaction zone, including light gases (e.g., $C_1$-$C_4$ gases, $H_2S$, $NH_3$) and all remaining hydrocarbons, move to a second reaction zone. In the two-stage configuration the feedstock is refined by passing it over a hydrotreating catalyst bed in the first reaction zone. The effluents are passed to a fractionating zone to separate the light gases, naphtha and diesel products which boil at a temperature range of 36° C. to 370° C. The hydrocarbons boiling above 370° C. pass to the second reaction zone for additional cracking.

Conventionally, most hydrocracking processes that are implemented for production of middle-distillates, e.g., those molecules which boil at a range of from about 180° C. to about 370° C. and gasoline, e.g., those molecules which boil at a range of from about 36° C. to about 180° C. after reforming processes.

In all of the above-described hydrocracking process configurations, cracked products, along with partially cracked and unconverted hydrocarbons, are passed to a distillation column for fractionating into products which may include naphtha, jet fuel/kerosene, and diesel fuel, which boil at the nominal ranges of 36° C.-180° C., 180° C.-240° C. and 240° C.-370° C., respectively, and unconverted products which boil at temperatures above 370° C. Typical jet fuel/kerosene fractions (i.e., smoke point>25mm) and diesel fractions (i.e., cetane number>52) are of high quality and exceed worldwide transportation fuel specifications. Although hydrocracking unit products have relatively low aromaticity, aromatics that do remain have lower key indicative properties (smoke point and cetane number).

In the above-described embodiments, the feedstocks generally include any liquid hydrocarbon feed conventionally suitable for hydrocracking operations, as is known to those of ordinary skill in the art. For instance, a typical hydrocracking feedstock is vacuum gas oil (VGO), which boils at temperatures of 370° C. to 520° C. Other intermediate refinery streams including demetalized oil (DMO) or de-asphalted oil (DAO), and coker gas oils from delayed coking units. Cycle oils from fluid catalytic cracking units which can be blended with VGO or can be used as is. The hydrocarbon feedstocks can be derived from naturally occurring fossil fuels such as crude oil, shale oils, coal liquid, or from intermediate refinery products or their distillation fractions such as naphtha, gas oil, or combinations of any of the aforementioned sources.

The catalysts used in first and second stage hydroprocessing reaction zones typically contain one or more active metal components selected from Group IVB, VB, VIB, VIIB or VIII of the Periodic Table of the Elements. In certain embodiments, the active metal component is one or more of cobalt, nickel, tungsten, molybdenum, or noble metals, such as platinum or palladium, typically deposited or otherwise incorporated on a support, e.g., alumina, silica alumina, silica, titanium or a zeolite or variations thereof which have been modified by, e.g., steam or acid treatment and/or insertion of metals into the zeolite structure.

The first stage process, referred to supra, hydrotreats the feedstock, essentially resulting in removal of nitrogen, sulfur, and sometimes metals contained in the feedstock molecules. Hydrocracking reactions which also take place in the first stage and result in conversion of from 10-65 wt % of the feedstock. As compared to the first stage, second stage processing occurs at lower temperatures, the specifics of which will depend on the feedstock. Exemplary conditions for both stages in these two stage processes include a reaction temperature of from 300° C. to 450° C., a reaction pressure of from 80 to 200 bars, and a hydrogen feed rate below 2500 SLt/Lt.

The catalysts used in the first and second stage may be the same, or different. Typically, a catalyst used in the first stage has an amorphous base (alumina or silica alumina), containing either Ni/Mo, Ni/W, or Pt/Pd when deep hydrogenation is needed. There are, however, process configurations directed to conversion of up to 75 wt % of the feedstock. In such processes, a zeolite catalyst is preferably used. The second stage catalyst may be any of these as well.

To increase the efficiency and profitability of the process, the hydrocracking units are pushed to process heavier feed streams, whether they are deep cut VGO or some other feedstream coming from intermediate refinery processes, such as a coker, an FCC or residue hydroprocessing units. These heavy feedstocks are processed at the cost of reduced cycle length, higher hydrogen consumption, and/or low product yields and quality. New catalysts and/or optimum layering of catalysts are needed to increase the process performance, in addition to optimizing other process parameters, such as better liquid-gas distribution, reactor volume efficiency, etc.

Catalyst layering or loading is well known in the art. For a given objective, hydrocracking catalysts are loaded, based on their functionality, e.g., acidity, and content of active metals, such as Co—Mo (usually used for hydrodesulfurization), Ni—Mo (usually used for hydrodenitrogenation), and Pt/Pd (usually used for hydrogenation for sulfur/nitrogen free hydrocarbons). These practices require lengthy catalyst testing programs to optimize the catalyst layering in the fixed-bed reactor.

Examples of catalytic layering techniques may be seen in, e.g., Published PCT Application 2011/0079540 to Krishna, et al., which describes methodologies where waxy, hydrocarbon feedstocks are contacted to layered catalysts; however, the double bond equivalency, or "DBE" model used by this invention, is not described, nor is the use of sulfur or nitrogen containing compounds, e.g., dibenzothiophenes or cabazoles, as well as derivates thereof, to determine catalytic activity for the layered catalysts. U.S. Pat. No. 5,186,818 to Daage, et al., also fails to teach a DBE model for testing catalysts. U.S. Pat. No. 7,387,712 to Furta, et al., U.S. Pat. No. 4,657,663 to Gardner, et al., and Published PCT Patent Application 2012/0111768 to Elsen, all describe layered catalyst systems, without describing the DBE method, which is key to the invention.

Also see, e.g., Published PCT Application 1993/021284, U.S. Pat. Nos. 8,163,169; 7,686,949; 6,576,119; 6,086,749; 5,916,529; 5,439,860; 4,822,476; 3,793,190; and 3,617,490, as well as JP 2010163622; JP 2003171671; JP 1080753; and CN 101053846, all of which are incorporated by reference.

It is a purpose of the invention to improve catalyst layering in hydrocarbon cracking processes, by evaluating the feedstock to be treated, and the properties of the catalysts which are employed. At present, standard methods for developing specific hydrocracking protocols use trial and error to select optimum catalytic systems. To elaborate the prior art methods briefly, catalysts are layered, and process performance is measured for each layered system. As this is a trial and error system, extensive testing is required.

The method of the invention varies from the standard methods, as will be shown in the disclosure which follows.

SUMMARY OF THE INVENTION

The invention relates to an improved method for catalytic hydrocracking, using a fixed bed hydrocracking system with layered catalysts. The method employs ranking and classifying catalysts, using model compounds which are known to be part of the material, to be treated such as a feedstock. One determines molecular composition and reactivity of the feedstock, e.g., and then evaluates catalysts on this basis. Especially useful in this analysis is the double bond equivalence or "DBE" of the material. Via utilizing data from the determination of catalyst activity and the molecular composition of, e.g., the feedstock, an optimum hydrocracking method and system can be set up. The details of the invention as well as specific embodiments thereof will be elaborated upon in the disclosure which follows.

DETAILED DESCRIPTION OF PREFERRED EMBODIMENTS

The invention relates to an improved method for hydrocracking a hydrocarbon containing feedstock. Containing hydrocarbons, via contacting the feedstock with a layered catalyst system, wherein each catalyst in said system carried out a different function. Details of the methodology will be elaborated upon, infra.

Example 1

This example describes how four different catalysts were evaluated to determine their efficacy in hydrogenation, and hydrocracking processes. Each catalyst was contacted with $H_2S$, for 2 hours, at 400° C. prior to the tests in order to convert the metal oxides in the catalyst to their active, sulfided forms. To test for hydrogenation, reactions were carried out at 330° C., and for hydrocracking, at 380° C. Other relevant parameters were the residence time with the catalyst (1 hour), the initial $H_2$ pressure (70 bars), the amount of catalyst (0.3 g), and reactant volume (1 0 ml).

The results follow, with values being in relation to the best catalyst for each task, which was assigned a value of 100:

TABLE 2

Relative Activities for Catalysts

| Catalysts/ Reactions | Catalyst Type | Catalyst Function | Hydrogenation of Methyl Naphthalene | Hydrocracking of Methyl Naphthalene |
|---|---|---|---|---|
| Catalyst 1 | Amorphous | HDS | 100 | 6 |
| Catalyst 2 | Amorphous | HDS/HDN | 68 | 42 |
| Catalyst 3 | Zeolite | Cracking | 62 | 74 |
| Catalyst 4 | Zeolite | Cracking | 82 | 100 |

To elaborate further, catalyst 1 was an amorphous catalyst containing CoMo/Al, known as HDS (hydrodesulfurization) catalyst. Catalyst 2, also anamorphous catalyst, is known as an HDS/HDN (hydrodenitrogenation) catalyst and contains Ni—Mo/Si—Al. Catalyst 3 and 4 are both zeolites, used for hydrocracking. Catalyst 3 designed for conventional VGO feedstock contains Ni—Mo/Si—Al, while catalyst 4 is designed for heavy oils, such as deasphalted oil, contains Ni—Mo/USY zeolite, with Ti—Zr inserted into the zeolite structure.

The experiments used methylnaphthalene, because its structure makes it ideal for both hydrogenation and hydrocracking. As it is known that in hydrocracking apparatus, the molecule is hydrogenated, first and then hydrocracked, knowing the composition of the feedstock permits one to select catalyst and order in layering.

Other compounds which may be used as the model compound include dibenzothiophene, as well as alkylated or naphthalated derivatives thereof, a basic nitrogen compounds, and carbazole molecules which boil at a temperature of from about 180° C. to about 520° C.

The values supra, show that for hydrocracking, catalyst 4 was the optimum choice, while catalyst 1 is preferred for hydrogenation.

This data can be used, as will be shown, infra, to layer catalysts, based upon the content of the feedstock or other material being treated.

Example 2

A feedstock blend was prepared, containing 15 V % demetalized oil ("DMO"), and 85 V % vacuum gas oil ("VGO"). The VGO was analyzed as containing 64% heavy VGO ("HVGO") and 21% light VGO ("LVGO").

The feedstock had a specific gravity of 0.918, an API gravity of 22.6 degrees, contained 2.2 wt % of sulfur, 751 ppmw nitrogen, and had a bromine number of 3.0 g/100 g feedstock. Other properties included 12.02 wt % hydrogen, an "IBP" (initial boiling point) of 210° C., a 10/30 of 344/411° C., a 50/70 of 451/498° C., a 90/95 of 595/655° C., and a 98 of 719° C. Maximum double bond equivalency ("DBE"), which is calculated for each molecule by counting the ring structures and the number of double bond present, values were 31 for S, 31 for N, and 32 for hydrocarbons.

Experiments were carried out using a two stage system with reactor in a series hydrocracking process. In the first stage, the feedstock was hydrodenitrogenated and hydrodesulfurized, and in the second stage, it was hydrocracked.

In the first stage, the feedstock was contacted to a layered catalyst system in a first reactor. The bottom layer of the layered system was a Ti, Zr-USY zeolite designed for DMO hydrocracking catalyst. It constituted 37.5 wt % of the amount of catalysts used into. An equal amount of an amorphous denitrogenation catalyst designed for VGO feedstock hydrocracking was placed on top of this.

After reacting with the layered catalysts, the reactor effluents moved to a second reactor, containing 25.0 wt % of a zeolite hydrocracking catalyst designed for VGO feedstock hydrocracking 4.

The table, which follows, details the results of the experiment:

| Operation time | hours | 134 | 182 | 278 |
|---|---|---|---|---|
| Temperature Reactor 1 | ° C. | 365.3 | 375.5 | 379.3 |
| Temperature Reactor 2 | ° C. | 350.5 | 360.1 | 364.7 |
| WABT | ° C. | 361.6 | 371.6 | 375.6 |
| LHSV | 1/hr | 0.36 | 0.362 | 0.334 |
| Density | Kg/Lt | 0.8475 | 0.8165 | 0.7826 |
| Sulfur | ppmw | 60.0 | 11.6 | 6.6 |
| Nitrogen | ppmw | 2.4 | 1.4 | 1.4 |
| Yields | | | | |
| $C_1$-$C_4$ | W % | 1.30 | 3.40 | 5.20 |
| $C_5$-85° C. | W %/FF | 1.4 | 2.5 | 4.1 |
| 85-149° C. | W %/FF | 10.5 | 21.0 | 36.8 |
| 149-185° C. | W %/FF | 4.7 | 8.7 | 13.4 |
| 185-240° C. | W %/FF | 9.6 | 14.0 | 16.6 |
| 240-315° C. | W %/FF | 13.0 | 14.1 | 11.8 |
| 315-375° C. | W %/FF | 10.5 | 8.9 | 4.6 |
| 375-560° C. | W %/FF | 41.6 | 22.3 | 5.1 |
| 560+° C. | W %/FF | 4.9 | 2.6 | 0.0 |
| Conversion 375° C.+ | wt % | 48.5 | 72.4 | 94.4 |

It will be seen that nearly all sulfur and nitrogen were removed at the end of the reaction, with nearly complete conversion of the feedstock to lighter weight molecules (i.e., those which boil at temperatures of 375° C. or below.

Example 3

This example shows the results of comparative experiments using different catalyst systems.

As with the preceding example, a two reactor system was used.

In a first set of experiments, the first reactor continued equal amounts (37.5 wt % each, based on total catalyst weight), of a Ti, Zr-USY zeolite catalyst designed for DMO feedstock hydrocracking, on top of which was placed a hydrotreating catalyst designed for VGO/Vacuum residue hydrodesulfurization (Co—Mo/Al, amorphous, without zeolite). The second reaction chamber contained 25 wt %, relative to total catalyst weight of Ni—Mo/USY zeolite, hydrocracking catalyst designed for VGO feedstock hydrocracking 4).

The catalytic system placed in the first reactor was designed for feedstocks which have a DBE>25, i.e., feedstock containing heavier molecules, (a blend of VGO and DMO), the latter of which is a solvent soluble fraction of vacuum residue, which boils at a temperature above 520° C.

The second test used, in the first reactor, a catalytic system designed for lighter molecules, i.e., feedstocks with a DBE<24, which is typical of VGO feedstocks, with boiling point of 370° C. to 520° C.

The first reactor contained, as its bottom layer, 60 wt % of a hydrodenitrogenation catalyst which was an amorphous, Ni—Mo/Si—Al catalyst, in contrast to the zeolite of the first example.

The upper layer of the catalyst system was a Co—Mo/Al amorphous, hydrodesulfurization catalyst. A total of 15.0 wt % of this catalyst was the top layer.

The second reactor was filled with 25 wt % of the same hydrocracking catalyst used in the first set of experiments.

The systems were then evaluated to determine what temperature was required to achieve a desired degree of hydrocracking.

The first catalytic system (Example 2) was found to require a temperature of 370° C., to achieve the same degree of hydrocracking as the second system (Example 3), or 395° C.

The foregoing examples set forth features of the invention, which relate to methods for improving or optimizing layered hydro cracking processes. The process of the invention calls upon one to determine at least one property of the feedstock to be used, such as the double bond equivalence, or "DBE". This determination of these properties is well within the purview of the skilled artisan. This determination permits the artisan to make a first selection of catalysts because, as shown, supra, different catalysts are useful for feedstocks with different properties, such as ranges of DBE values.

Following this step, the process involves selecting a molecule which is present in the feedstock, so as to test it, in its pure form, with various catalysts. Again, the skilled artisan can easily determine the molecular content of a feedstock.

The molecule chosen must be capable of being one or more of hydrogenated, hydrodesulfurized, or hydrodenitrogenated. Indeed, it may be capable of being subject to two, or all 3 of these reactions.

The test molecule is then contacted to a plurality of catalysts useful for hydrocracking feedstock with the predetermined DBE, with the catalyst being evaluated as a result of the products of the hydrocracking process.

As hydrocracking reduces DBE values, the next step in the process calls for assessing a second plurality of catalysts, with the same properties as listed supra, except this second group of catalysts is chosen from catalysts known to be suitable for feedstocks with DBE values below the first group.

Once an optimal catalyst is determined, the first and second catalysts are layered in a reaction chamber, followed by contact of a feedstock thereto, under conditions, such as those discussed infra, which promote formation of lower weight hydrocarbons from the feedstock.

Other facets of the invention will be clear to the skilled artisan and need not be reiterated here.

The terms and expression which have been employed are used as terms of description and not of limitation, and there is no intention in the use of such terms and expression of excluding any equivalents of the features shown and described or portions thereof, it being recognized that various modifications are possible within the scope of the invention.

The invention claimed is:

1. A method for optimizing a layered hydrocracking catalytic process, comprising (i) contacting a model compound capable of (a) being hydrocracked as well as at least one of (ii) hydrogenation, hydrosulfurization and hydrodenitrogenation to a plurality of catalysts to determine an optimal catalyst for each of (i) and (ii), (b) following by layering the optimal catalysts for each of (i) and (ii) in a reaction chamber based on their activity reacting with said model compound, and (c) contacting a feedstock to the layered catalysts under condition favoring formation of lower weight hydrocarbon from said hydrocarbon containing feedstock, wherein said model compound boils in the range of 180° C.-520° C. and is selected from the group consisting of methylnaphthalene, dibenzothiophene, an alkylated or naphtalated derivative thereof, a basic nitrogen compound and a carbazole molecule.

2. The method of claim 1, further comprising determining double bond equivalence (DBE,) of said feedstock, and contacting said model compound to a plurality of catalysts suitable for hydrocracking a substance with a DBE of said feedstock, to determine an optimum hydrocracking catalyst for said feedstock.

3. The method of claim 2, further comprising contacting said model compound to a second plurality of catalysts suitable for hydrogenerating, hydrodesulfurizing, or hydrodenitrogenating a substance with a DBE value less than said feedstock to determine an optimal, second catalyst.

4. The method of claim 2, wherein said hydrocarbons contained in said feedstock have a double bond equivalency of 24 or less.

5. The method of claim 2, wherein said feedstock has a double bond equivalency of 24 or less, and at least one of said catalysts for VGO hydrocracking catalyst.

6. The method of claim 2, wherein said feedstock has a double bond equivalency of 25 or more, and at least one of said catalysts is a catalyst designed for heavy feedstock.

7. The method of claim 1, comprising contacting said hydrocarbon containing feedstock to said reaction chamber at a temperature of from 350° C. to 450° C.

8. The method of claim 1, comprising contacting said hydrocarbon containing feedstock to said reaction chamber at a hydrogen feed rate less than 2500 liters per liter of feedstock.

9. The method of claim 1, comprising contacting said hydrocarbon containing feedstock to said reaction vessel at a pressure of from 100 bars to 200 bars.

10. The method of claim 1, wherein at least one of said catalysts contains a metal from Group VI, VII or VIIIB of the periodic table, or is a noble metal.

11. The method of claim 10, wherein said metal is Co, Ni, W, Mo, Pt, or Pd.

12. The method of claim 1, wherein at least one of said catalysts contains amorphous alumina, silica-alumina, titanium, Y zeolite, or at least one a transition metal inserted Y zeolite.

13. The method of claim 12, wherein said transition metal is Zr, Ti, Hf and combination thereof.

14. The method of claim 1, wherein said molecule is capable of being at least two of hydrogenated, hydrodesulfurized, and Itydrodenitrogenated.

15. The method of claim 1, wherein said molecule is capable of being hydrogenated, hdrodesulfurized, and hydrodenitrogenated.

* * * * *